United States Patent
Nishijima

(10) Patent No.: US 9,219,417 B2
(45) Date of Patent: Dec. 22, 2015

(54) SWITCHING POWER SUPPLY DEVICE

(71) Applicant: FUJI ELECTRIC CO., LTD., Kawasaki (JP)

(72) Inventor: Kenichi Nishijima, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 257 days.

(21) Appl. No.: 13/862,367

(22) Filed: Apr. 12, 2013

(65) Prior Publication Data

US 2013/0279203 A1    Oct. 24, 2013

(30) Foreign Application Priority Data

Apr. 18, 2012    (JP) ................................ 2012-095171

(51) Int. Cl.
| | | |
|---|---|---|
| H04B 1/26 | (2006.01) | |
| H04B 15/00 | (2006.01) | |
| H02M 3/335 | (2006.01) | |
| H02M 1/44 | (2007.01) | |

(52) U.S. Cl.
CPC ................ *H02M 3/335* (2013.01); *H02M 1/44* (2013.01)

(58) Field of Classification Search
USPC ........ 455/266, 63.1, 130, 313, 333, 295, 296, 455/297
See application file for complete search history.

(56) References Cited

U.S. PATENT DOCUMENTS

| | | | |
|---|---|---|---|
| 4,856,084 | A | 8/1989 | Richards, Jr. |
| 7,075,803 | B2* | 7/2006 | Eberlein .......................... 363/41 |
| 7,142,819 | B1* | 11/2006 | Kang et al. ................... 455/63.3 |
| 2004/0100328 | A1* | 5/2004 | Melanson ..................... 330/297 |
| 2011/0034132 | A1* | 2/2011 | Babitch .......................... 455/76 |
| 2011/0075721 | A1* | 3/2011 | Minakawa et al. ........... 375/238 |
| 2012/0052813 | A1* | 3/2012 | Patel .......................... 455/63.1 |

FOREIGN PATENT DOCUMENTS

| | | |
|---|---|---|
| JP | 63-158929 A | 7/1988 |
| JP | 01-248714 A | 10/1989 |
| JP | 2003-153526 A | 5/2003 |
| JP | 2011-139324 A | 7/2011 |

* cited by examiner

*Primary Examiner* — Ping Hsieh
(74) *Attorney, Agent, or Firm* — Rabin & Berdo, P.C.

(57) ABSTRACT

A switching power supply device that can reduce power supply noise includes a switching power supply device main body that switches a semiconductor switching element at a power supply frequency fs, and supplies power to an electronic instrument such as an AM radio receiver. The switching power supply device detects an AM radio reception frequency fc and a power supply harmonic component that interferes with the AM radio reception frequency fc. Further, the switching power supply device determines, in a sideband of the AM radio reception frequency fc on a side that does not include the power supply harmonic component, a jitter width Δf for the power supply frequency fs, avoiding a bandwidth BW of the AM radio reception frequency fc, controlling the jitter of the power supply frequency fs in the jitter width Δf, and switching the semiconductor switching element at a frequency of [fs±Δf/2].

4 Claims, 6 Drawing Sheets

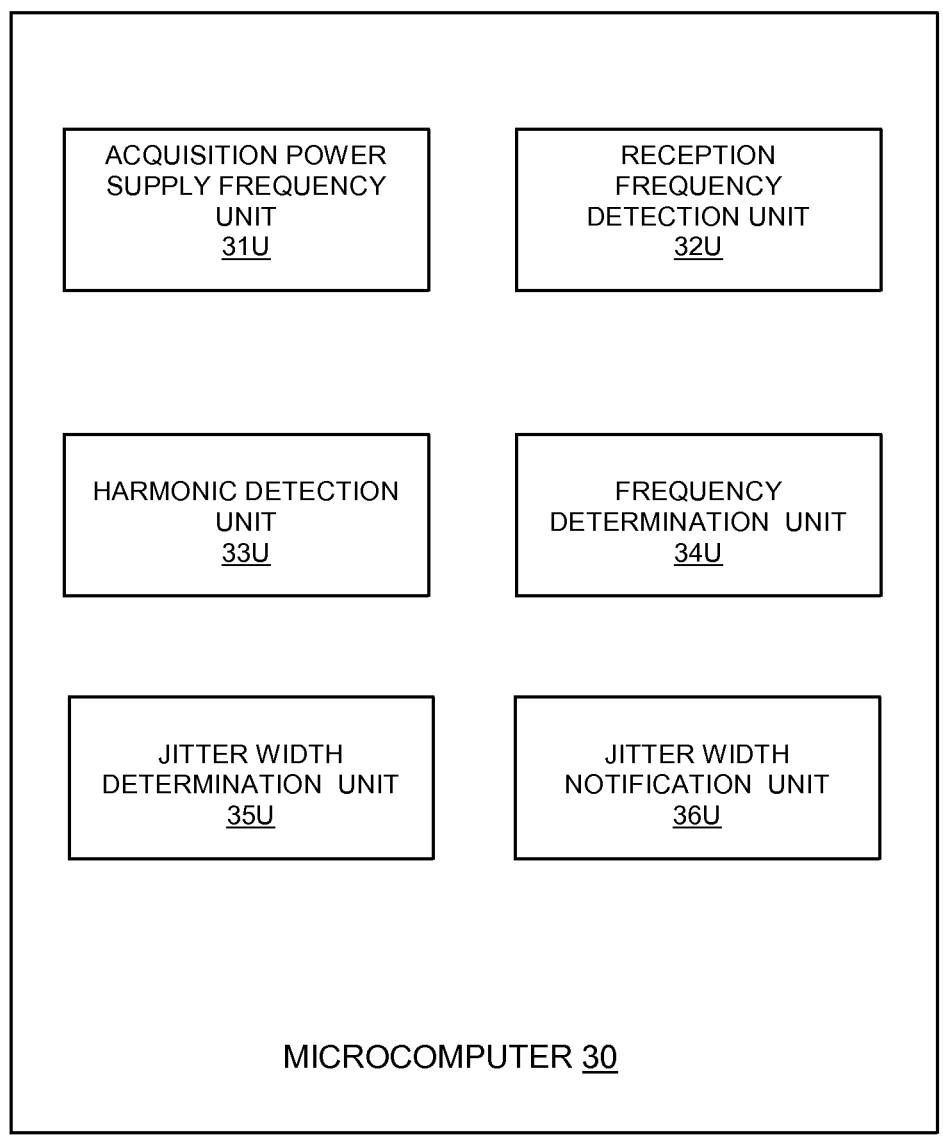

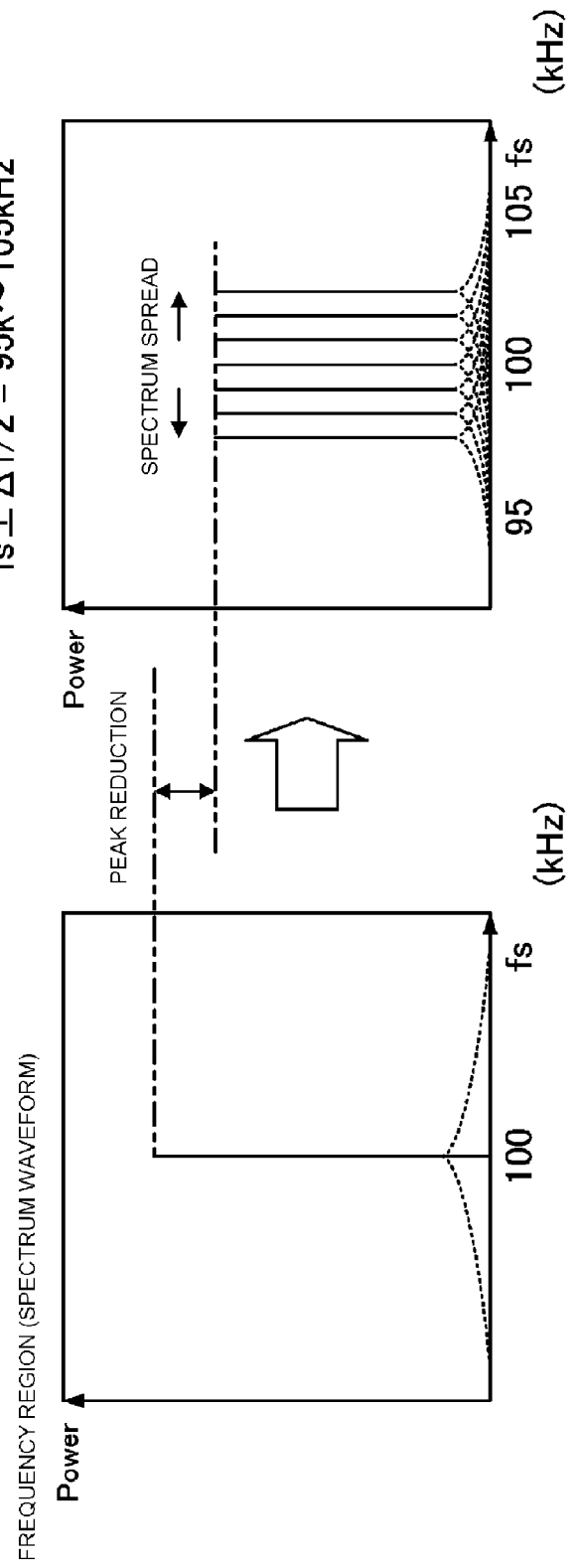

SWITCHING POWER SUPPLY DEVICE

BACKGROUND OF THE INVENTION

1. Technical Field

The present invention relates to a switching power supply device such that an impeding of the reception of an AM radio broadcast due to power supply noise is avoided, and a reduction in power supply noise is achieved.

2. Related Art

It is undeniable that, in a switching power supply device, high frequency power supply noise (electromagnetic interference noise; EMI noise) is generated accompanying a switching operation in a semiconductor switching element. In the event that the frequency of this kind of power supply noise overlaps an AM radio frequency bandwidth, it is a cause of hindering the reception of the AM radio broadcast (AM reception impedance). Therefore, to date, it has been proposed that reception impedance is avoided by demodulating an AM signal from a sideband on a side of an AM radio receiver in which high frequency power supply noise from the switching power supply device is not included (for example, refer to JP-B-63-158929).

Also, it has also been proposed that electromagnetic interference noise (power supply noise) accompanying a switching operation is reduced by applying random fluctuation (jitter) to a switching frequency in a switching power supply device (for example, refer to JP-A-2003-153526).

However, even when reducing power supply noise using the switching frequency jitter control technology introduced in JP-A-2003-153526, impeding of the reception of an AM radio broadcast due to the power supply noise is not necessarily avoided. In fact, when controlling the jitter of the switching frequency, the power spectrum of the power supply noise spreads over the frequency axis, without concentrating at a specific frequency. Because of this, the possibility of the power supply noise frequency overlapping (interfering with) the AM radio frequency bandwidth increases, and there is conversely concern that the power supply noise frequency constitutes a factor in impeding the reception of the AM radio broadcast.

SUMMARY OF THE INVENTION

The invention, having been contrived giving consideration to this kind of situation, has an object of providing a switching power supply device such that interference between power supply noise frequency and an AM radio frequency bandwidth is avoided, thus avoiding impeding the reception of an AM radio broadcast, and a reduction of power supply noise is achieved.

In order to achieve the heretofore described object, a switching power supply device according to one aspect of the invention includes a switching power supply device main body that switches direct current power using a semiconductor switching element on-off driven at a power supply frequency fs, rectifies and smoothes the switched power, and supplies direct current voltage to an electronic instrument including an AM radio receiver. The switching power supply device further includes a reception frequency detection unit that detects an AM radio reception frequency fc, a harmonic detection unit that detects a power supply harmonic component generated in accompaniment to a switching operation of the semiconductor switching element and interfering with the AM radio reception frequency fc, and a frequency determination unit that determines whether the detected power supply harmonic component is higher or lower than the AM radio reception frequency fc.

The switching power supply device further includes a jitter width determination unit that, on a sideband side that does not include the power supply harmonic component, determines a jitter width $\Delta f$ for the power supply frequency fs from the switching power supply frequency fs, a power supply harmonic component order n, the AM radio reception frequency fc, and a bandwidth BW thereof, avoiding the bandwidth BW, in accordance with the result of the determination by the frequency determination unit. The switching power supply device further includes a jitter control unit that controls the jitter of the power supply frequency fs in accordance with the determined jitter width $\Delta f$, thereby switching the semiconductor switching element at a frequency of $[fs \pm \Delta f/2]$.

The jitter width determination unit may be configured so as to calculate the jitter width $\Delta f$ satisfying the relationship of $$(fs - \Delta f/2) \times n > fc + BW/2$$

when the power supply harmonic component is higher than the AM radio reception frequency fc, and calculate the jitter width $\Delta f$ satisfying the relationship of $$(fs + \Delta f/2) \times n < fc - BW/2$$

when the power supply harmonic component is lower than the AM radio reception frequency fc.

Also, the jitter control unit is configured to pulse width modulate a pulse signal that on-off drives the semiconductor switching element using, for example, a triangular wave signal of a constant frequency fm, thereby modulating the power supply frequency fs across a range of $\pm \Delta f/2$. Also, the jitter control unit may be configured to not execute the power supply frequency fs jitter control (e.g., operate the switching power supply device at the frequency fs) when the jitter width $\Delta f$ calculated with the jitter width determination unit is negative.

According to the switching power supply device with the heretofore described configuration, as the jitter width $\Delta f$ for the switching power supply frequency fs is determined avoiding the sideband width BW of the AM radio reception frequency to be received, and the jitter of the power supply frequency fs is controlled on the sideband side of the AM radio reception frequency that does not include the power supply harmonic component, it is possible to avoid interference between the power supply noise frequency and AM radio frequency bandwidth, and thus possible to avoid impeding the reception of the AM radio broadcast.

Moreover, as it is possible to spread the power spectrum of the power supply noise frequency owing to the power supply frequency fs jitter control, thus reducing the noise level thereof, it is possible to considerably reduce noise interference with respect to an electronic instrument including an AM radio receiver. Also, even when the vehicle in which the switching power supply device is mounted moves, and the AM radio frequencies that can be received vary accordingly, it is possible to adaptively change the range of the power supply frequency fs jitter control in accordance with the frequency of the AM radio broadcast to be received, meaning that it is possible to effectively achieve a reduction of power supply noise in accordance with the environment (the region through which the vehicle is moving).

BRIEF DESCRIPTION OF THE DRAWINGS

FIG. 2B shows units of the microcomputer;

FIG. 5 is a diagram showing a change in power supply noise level accompanying switching power supply frequency jitter control.

DETAILED DESCRIPTION OF THE EMBODIMENTS

Figure 1:
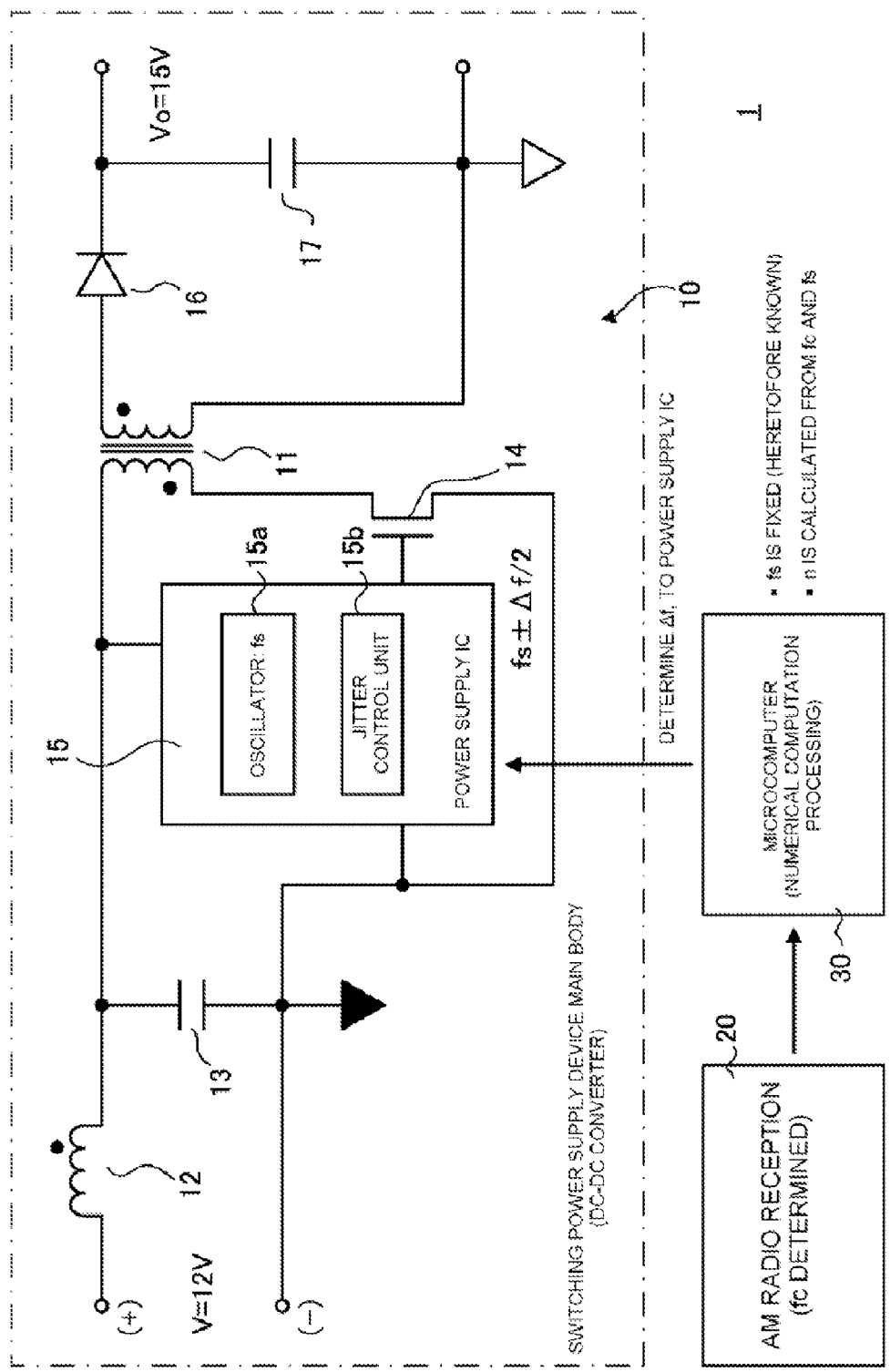
FIG. 1 is a schematic configuration diagram of a switching power supply device according to an embodiment of the invention.

Hereafter, referring to the drawings, a description will be given of a switching power supply device according to an embodiment of the invention.

FIG. 1 is a schematic diagram showing an overall configuration of a switching power supply device 1, wherein reference sign 10 indicates a switching power supply device main body (a DC-DC converter). The switching power supply device main body 10 is for mounting in a vehicle, and bears a role of switching direct current power (12V) supplied from a battery (not shown) mounted in the vehicle at a predetermined power supply frequency fs, applying the power to an insulating transformer 11, rectifying and smoothing alternating current power extracted from the secondary side of the insulating transformer 11, and supplying direct current voltage to each kind of electronic instrument (vehicle-mounted instrument) mounted in the vehicle together with the switching power supply device main body 10.

Specifically, the direct current power (12V) is taken in via an input filter circuit formed of an inductor 12 and an input capacitor 13 provided in an input stage of the switching power supply device main body 10, applied to a semiconductor switching element (hereafter abbreviated to "switching element") 14 via a primary side of the insulating transformer 11, and switched. The switching element 14 is formed of, for example, an IGBT, and is on-off driven at the power supply frequency fs under the control of a power supply IC 15, which is a switching control circuit. The direct current power is converted to alternating current power via the insulating transformer 11 by switching with the switching element 14.

Then, the boosted alternating current power extracted from the secondary side of the insulating transformer 11 is rectified and smoothed via an output filter circuit formed of a rectifying diode 16 and output capacitor 17, and supplied as a direct current power of, for example, 15V to an AM radio receiver 20, and the like, mounted in the vehicle. Herein, a description will be given with a flyback type DC-DC converter using the insulating transformer 11 as an example, but the invention is applicable to any kind of heretofore proposed circuit type DC-DC converter, with the exception of a self-exciting type of DC-DC converter.

Also, the power supply IC 15 in the switching power supply device main body 10, for example, includes an oscillator 15a that generates a pulse signal wherein the basic power supply frequency fs is 100 kHz, thus on-off driving the switching element 14, and also includes a jitter control unit 15b that applies fluctuation (jitter) to the power supply frequency fs by PWM controlling the pulse signal. The jitter control unit 15b bears a role of, with a jitter width Δf set as described hereafter, shifting the power supply frequency within a range of [fs±Δf/2] with, for example, a triangular wave as a control signal waveform, thus switching (on-off driving) the switching element 14. When the jitter control with the jitter control unit 15b is stopped, the switching element 14 is switched at the constant (100 kHz) power supply frequency fs.

With respect to the switching power supply device main body 10 configured in this way, the switching power supply device 1 further includes a power supply IC control function whereby an AM radio reception frequency fc of a radio broadcast received (e.g., attempted to be received) with the AM radio receiver 20 is detected, the jitter width Δf for the power supply frequency fs is determined in accordance with the AM radio reception frequency fc, and the operation of the jitter control unit 15b is controlled. The power supply IC control function is realized with, for example, a microcomputer 30 provided accompanying the switching power supply device main body 10, and the following processing functions are incorporated in the microcomputer 30.

That is, the microcomputer 30 includes a reception frequency detection unit that detects the AM radio reception frequency fc in the AM radio receiver 20, a harmonic detection unit that detects a power supply harmonic component (harmonic static) generated by the switching power supply device main body 10 and interfering with the AM radio reception frequency fc, and a jitter width determination unit that determines the jitter width Δf for the power supply frequency fs in accordance with the results of the heretofore described detections, and provides information on the determination to the power supply IC 15 (jitter control unit 15b).

Figure 2A:
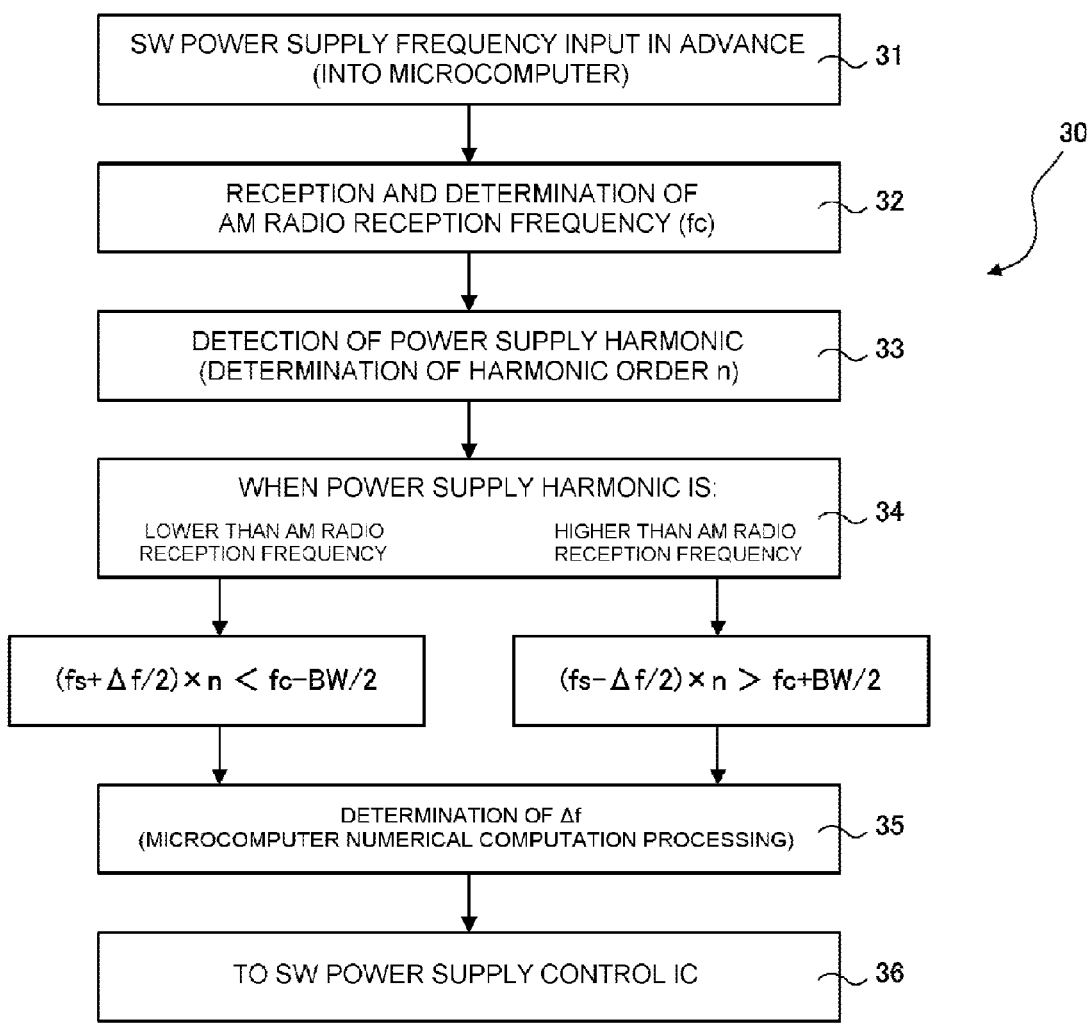
FIG. 2A is a diagram showing processing functions in a microcomputer in the switching power supply device shown in FIG. 1.

Specifically, as shown by the microcomputer 30 process flow in FIG. 2A, the microcomputer 30 executes an operation 31 that acquires the basic power supply frequency fs of switching in the switching power supply device main body 10, based on the specifications of the switching power supply device main body 10. The operation 31 may be performed by a power supply frequency acquisition unit 31U as shown in FIG. 2B. Also, the microcomputer 30 executes an operation 32 that detects the AM radio reception frequency fc that is to be received from station selection information of the AM radio receiver 20. The operation 32 may be performed by a reception frequency detection unit 32U as shown in FIG. 2B.

Then, the microcomputer 30, based on the basic power supply frequency fs and AM radio reception frequency fc detected as described above, determines a power supply static frequency component from the switching power supply device main body 10 that constitutes a factor in impeding the reception of the AM radio broadcast on the relevant reception frequency fc. Specifically, the microcomputer 30 performs an operation 33 that determines a power supply harmonic component generated in accompaniment to the switching in the switching element 14 as an order n[=fc/fs] of the harmonic. The operation 33 may be performed by a harmonic detection unit 33U as shown in FIG. 2B. Further, the microcomputer 30 performs an operation 34 that determines whether the detected power supply harmonic component is higher or lower than the AM radio reception frequency fc. The operation 34 may be performed by a frequency determination unit 34U as shown in FIG. 2B The microcomputer 30 further performs an operation 35 that subsequently, on a sideband side of the AM radio reception frequency fc that does not include the power supply harmonic component, determines the jitter width Δf for the power supply frequency fs from the switching power supply frequency fs, the power supply harmonic component order n, the AM radio reception frequency fc, and a bandwidth BW thereof, avoiding the bandwidth BW, in accordance with the result of the determination by the frequency determination unit 34. The operation 35 may be performed by a jitter width determination unit 35U as shown in FIG. 2B.

Specifically, when the power supply harmonic component is lower than the AM radio reception frequency fc, the jitter width Δf for the power supply frequency fs is determined so as to satisfy the condition $$(fs+\Delta f/2) \times n < fc - BW/2 \quad (1).$$

Conversely, when the power supply harmonic component is higher than the AM radio reception frequency fc, the jitter width Δf for the power supply frequency fs is determined so as to satisfy the condition $$(fs-\Delta f/2) \times n > fc + BW/2 \quad (2).$$

Further, the microcomputer 30 performs an operation 36 that provides the jitter control unit 15b of the power supply IC 15 with the jitter width Δf determined as described above. The operation 36 may be performed by a jitter width notification unit 36U as shown in FIG. 2B. Then, the jitter control unit 15b, in accordance with the jitter width Δf determined by the microcomputer 30, controls the jitter of the power supply frequency fs on the sideband side of the AM radio reception frequency fc that does not include the power supply harmonic component, thereby switching the switching element 14 at the frequency of [fs±Δf/2].

When the power supply harmonic component is included in both sidebands of the AM radio reception frequency fc, and it is not possible to avoid impeding the reception of the AM radio reception frequency fc even when controlling the power supply frequency fs jitter, control of the power supply frequency fs jitter is prevented by prohibiting the operation of the jitter control unit 15b. Consequently, in this case, the switching element 14 is switched at the constant power supply frequency fs.

Figure 3:
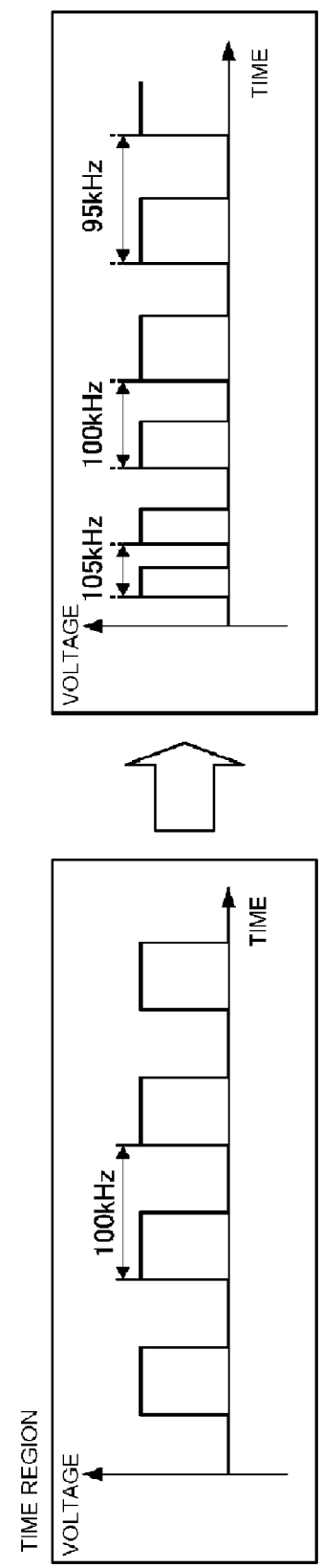
FIG. 3 is a diagram showing the concept of a switching power supply frequency jitter control.
Figure 4:
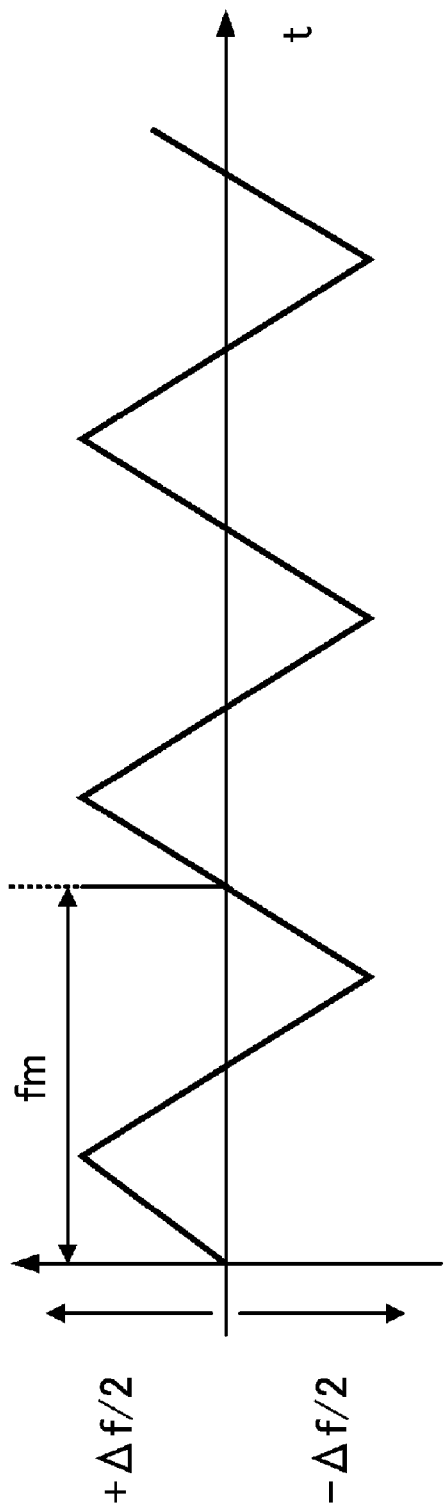
FIG. 4 is a diagram showing an example of switching power supply frequency jitter control using a triangular wave.

At this point, a more detailed description will be given of the power supply frequency fs jitter control. Control of the jitter of the power supply frequency fs that switches the switching element 14 is performed by, for example, pulse width modulating the pulse signal of the constant frequency fs (for example, 100 kHz) that on-off drives the switching element 14, shifting the frequency in a range of 95 kHz to 105 kHz, as shown by the outline of the jitter control in FIG. 3. Control of the frequency shift is achieved by, for example, varying the constant frequency fs within a frequency range of ±Δf/2 in a constant cycle fm, using a triangular wave as a control signal, as shown in FIG. 4.

According to this kind of power supply frequency fs jitter control, as shown in FIG. 5, the noise level (peak power level) at the power supply frequency fs (100 kHz) spectrum spreads in the frequency range (95 kHz to 105 kHz) derived from [fs±Δf/2], and the peak power level decreases relatively. As a result of this, the frequency band of the harmonic power supply noise also widens, together with which the average level of the harmonic power supply noise (conducted EMI noise) also decreases considerably.

Specifically, by performing a jitter control of ±7 kHz on the power supply frequency fs of 100 kHz, the average value of the power supply noise level in an AM radio reception frequency band of 500 kHz decreases from 58 dBμV to 42 dBμV. Also, the average value of the power supply noise level in an AM radio reception frequency band of 1500 kHz also decreases, from 42 dBμV to 26 dBμV. That is, the average value of the conducted EMI noise level in an AM radio reception frequency bandwidth of, for example, 500 kHz to 1700 kHz decreases by approximately 15 dBμV or more owing to the heretofore described power supply frequency fs jitter control.

Due to the spectrum spread of the power supply noise frequency, however, the harmonic frequency component of the power supply noise interferes with the AM radio reception frequency fc, and there is concern that this will lead to an impeding of the reception of the AM radio broadcast. Therefore, the device 1 is such that, as previously described, the order n of the harmonic power supply noise frequency component that constitutes a factor in impeding the reception of the AM radio broadcast on the relevant reception frequency fc is determined based on the basic power supply frequency fs and AM radio reception frequency fc, and the jitter width Δf for the power supply frequency fs is determined from the AM radio reception frequency fc and the bandwidth BW thereof, avoiding the bandwidth BW.

Specifically, when the AM radio reception frequency fc is 540 kHz, the order n of the harmonic power supply noise that constitutes a factor in impeding the reception of the AM radio broadcast is determined as $$n = fc/fs = 540 \text{ k}/100 \text{ k} = 5.4 (=>5).$$

Further, the frequency of the harmonic power supply noise is lower than the AM radio reception frequency fc in this case, meaning that, assigning the values fs(=100 k), fc(=540 k), n(=5), and BW(=15 k; constant) to Equation (1), the jitter width Δf is calculated by $$(100 \text{ k}+\Delta f/2) \times 5 < 540 \text{ k} - 15 \text{ k}/2,$$

so Δf<13 k.

Further, calculating the shift width (Δf/2) of the power supply frequency fs to be ±6.5 kHz, for example, the jitter of the power supply frequency fs(=100 k) is controlled in the shift width Δf/2(=±6 kHz) range. As a result of this, even when varying the switching frequency between 94 kHz and 106 kHz by controlling the power supply frequency fs jitter, the frequency of the harmonic power supply noise thereof no longer infiltrates the 15 kHz bandwidth of the AM radio reception frequency of 540 kHz (540 kHz±15/2 kHz; 532.5 kHz to 547.5 kHz). Consequently, it is possible to achieve a reduction in power supply noise level without causing interference with the AM radio reception frequency fc(=540 kHz).

Also, in the same way, when receiving an AM radio broadcast of which the reception frequency fc is 864 kHz, the order n of the harmonic power supply noise that constitutes a factor in impeding the reception of the AM radio broadcast is determined as $$n = fc/fs = 864 \text{ k}/100 \text{ k} = 8.64 (=>9).$$

Further, the frequency of the harmonic power supply noise is higher than the AM radio reception frequency fc in this case, meaning that, assigning the values fs(=100 k), fc(=864 k), n(=9), and BW(=15 k; constant) to Equation (2), the jitter width Δf is calculated by $$(100 \text{ k}-\Delta f/2) \times 9 > 864 \text{ k} + 15 \text{ k}/2,$$

so Δf<6.3 k.

Further, calculating the shift width (Δf/2) of the power supply frequency fs to be ±3.15 kHz, for example, the jitter of the power supply frequency fs(=100 k) is controlled in the shift width Δf/2(=±3 kHz) range. As a result of this, even when varying the switching frequency between 97 kHz and 103 kHz by controlling the power supply frequency fs jitter, the frequency of the harmonic power supply noise thereof no longer infiltrates the 15 kHz bandwidth of the AM radio reception frequency of 864 kHz (864 kHz±15/2 kHz; 856.5 kHz to 871.5 kHz). Consequently, in this case too, it is possible to achieve a reduction in power supply static noise without causing interference with the AM radio reception frequency fc(=864 kHz).

Furthermore, when receiving an AM radio broadcast of which the reception frequency fc is 1512 kHz, the order n of the harmonic power supply noise that constitutes a factor in impeding the reception of the AM radio broadcast is determined as $$n = fc/fs = 1512 \text{ k}/100 \text{ k} = 15.12 (\Rightarrow 15).$$

Further, the frequency of the harmonic power supply noise is lower than the AM radio reception frequency fc in this case, meaning that, assigning the values fs(=100 k), fc(=1512 k), n(=15), and BW(=15 k; constant) to Equation (1), the jitter width Δf is calculated by $$(100 \text{ k} + \Delta f/2) \times 15 < 1512 \text{ k} - 15 \text{ k}/2,$$

so Δf<−1 k.

In this case, however, the jitter width Δf is negative (jitter control conditions are not satisfied) so, even supposing that the power supply frequency fs jitter are controlled, there would in fact be interference with the AM radio reception frequency fc(=1512 kHz), meaning that power supply frequency fs jitter control is prohibited in this case. In other words, priority being given to not causing interference with the AM radio reception frequency fc(=1512 kHz), suppression of harmonic power supply noise by controlling the power supply frequency fs jitter is not carried out. That is, control of the power supply frequency fs jitter is not carried out.

Thus, according to the device 1 wherein the jitter width Δf of the power supply frequency fs is determined and the switching frequency jitter is controlled as heretofore described, it is possible to reduce the level (static level) of harmonic power supply noise, while avoiding interference with the AM radio reception frequency fc, by detecting the AM radio reception frequency fc that is to be received. In particular, although the frequencies of AM radio broadcasts that can be received vary according to region, it is possible to reduce the level (static level) of harmonic power supply noise, while adaptively avoiding interference with the AM radio reception frequency fc, simply by detecting the AM radio reception frequency fc that is to be received in accordance with the position (the region through which the vehicle is moving) of the vehicle in which the device 1 is mounted, and determining the jitter width Δf of the power supply frequency fs in accordance with information on the detection. Consequently, it is possible to reduce harmonic power supply noise without causing an impeding of the reception of the AM radio broadcast.

The invention is not limited to the heretofore described embodiment. For example, with regard to the power supply frequency fs jitter control, it is also possible to carry out pulse width modulation of the switching pulse signal using a sinusoidal wave, or the like, instead of the previously described triangular wave. Also, a description has been given here with the basic power supply frequency fs as 100 kHz, but it goes without saying that the invention can also be applied in the same way to a DC-DC converter that switches at a different power supply frequency fs. Various other modifications can be implemented without departing from the scope of the invention.

What is claimed is:

1. A switching power supply device, comprising:
   a switching power supply device main body that switches direct current power using a semiconductor switching element on-off driven at a power supply frequency fs, rectifies and smoothes the switched power, and supplies direct current voltage to an electronic instrument including an AM radio receiver;
   a reception frequency detection unit that detects an AM radio reception frequency fc;
   a harmonic detection unit that detects a power supply harmonic component generated in accompaniment to a switching operation of the semiconductor switching element and interfering with the AM radio reception frequency fc;
   a frequency determination unit that determines whether the detected power supply harmonic component is higher or lower than the AM radio reception frequency fc;
   a jitter width determination unit that, in a sideband of the AM radio reception frequency fc on a side that does not include the power supply harmonic component, determines a jitter width Δf for the power supply frequency fs from the switching power supply frequency fs, a power supply harmonic component order n, the AM radio reception frequency fc, and a bandwidth BW thereof, avoiding the bandwidth BW, in accordance with the result of the determination by the frequency determination unit; and
   a jitter control unit that controls the jitter of the power supply frequency fs in accordance with the determined jitter width Δf, thereby switching the semiconductor switching element at a frequency of [fs ±Δf/2].

2. The switching power supply device according to claim 1, wherein
   the jitter width determination unit calculates the jitter width Δf satisfying the relationship of $$(fs - \Delta f/2) \times n \geq fc + BW/2$$

when the power supply harmonic component is higher than the AM radio reception frequency fc, and calculates the jitter width Δf satisfying the relationship of $$(fs + \Delta f/2) \times n \leq fc - BW/2$$

when the power supply harmonic component is lower than the AM radio reception frequency fc.

3. The switching power supply device according to claim 1, wherein
   the jitter control unit pulse width modulates a pulse signal that on-off drives the semiconductor switching element using a triangular wave signal of a constant frequency fm, thereby modulating the switching power supply frequency fs across a range of ±Δf/2.

4. The switching power supply device according to claim 1, wherein
   the jitter control unit does not execute the switching power supply frequency fs jitter control when the jitter width Δf calculated with the jitter width determination unit is negative.

* * * * *